United States Patent
Yun et al.

(10) Patent No.: US 12,309,136 B2
(45) Date of Patent: May 20, 2025

(54) METHOD AND APPARATUS FOR ACCESS CONTROL ON SHIP NETWORK

(71) Applicant: Penta Security Inc., Seoul (KR)

(72) Inventors: Keon Yun, Seoul (KR); Myung Woo Chung, Seoul (KR); Sang Gyoo Sim, Seoul (KR); Jin Hyuk Jung, Goyang-si (KR); Duk Soo Kim, Seoul (KR); Seok Woo Lee, Seoul (KR)

(73) Assignee: Penta Security Inc., Seoul (KR)

( * ) Notice: Subject to any disclaimer, the term of this patent is extended or adjusted under 35 U.S.C. 154(b) by 225 days.

(21) Appl. No.: 17/663,998

(22) Filed: May 18, 2022

(65) Prior Publication Data

US 2023/0164134 A1 May 25, 2023

(30) Foreign Application Priority Data

Nov. 23, 2021 (KR) .................... 10-2021-0162302

(51) Int. Cl.
*H04L 9/40* (2022.01)
(52) U.S. Cl.
CPC ...... *H04L 63/0823* (2013.01); *H04L 63/0869* (2013.01); *H04L 63/107* (2013.01)
(58) Field of Classification Search
CPC ............. H04L 63/0823; H04L 63/0869; H04L 63/107; H04L 63/02; H04L 63/102
See application file for complete search history.

(56) References Cited

U.S. PATENT DOCUMENTS

| 8,504,836 | B2 * | 8/2013 | Zhang | .................. | H04L 9/0822 |
| | | | | | 713/168 |
| 9,923,868 | B2 | 3/2018 | Weber | | |

(Continued)

FOREIGN PATENT DOCUMENTS

| EP | 1381201 A2 * | 1/2004 | ........... H04L 63/061 |
| KR | 10-0376618 B1 | 3/2003 | |

(Continued)

OTHER PUBLICATIONS

M. Schukat and P. Cortijo, "Public key infrastructures and digital certificates for the Internet of things," 2015 26th Irish Signals and Systems Conference (ISSC), Carlow, Ireland, 2015, pp. 1-5, doi: 10.1109/ISSC.2015.7163785. (Year: 2015).*

(Continued)

*Primary Examiner* — Jung W Kim
*Assistant Examiner* — Sameera Wickramasuriya
(74) *Attorney, Agent, or Firm* — BROADVIEW IP LAW, PC

(57) ABSTRACT

A ship network access control method may comprise: receiving, from an agent installed in a specific sub-network among sub-networks of the ship network, a registration request message requesting registration based on an agent certificate, and verifying the agent certificate; in response to determining that the agent certificate is valid, transmitting, to the agent, agent registration information for the agent; receiving, from the agent, a connection request message generated based on the agent registration information, and verifying the agent registration information; in response to determining that the agent registration information is successfully verified, performing a mutual authentication protocol with the agent; and determining whether to allow a connection between the first terminal and a second terminal located in another sub-network of the ship network or an external network according to an authority of the agent.

18 Claims, 6 Drawing Sheets

(56) References Cited

U.S. PATENT DOCUMENTS

| | | | |
|---|---|---|---|
| 2006/0053290 A1* | 3/2006 | Randle | G06Q 20/027 |
| | | | 713/153 |
| 2007/0016679 A1 | 1/2007 | Mayfield et al. | |
| 2008/0009265 A1* | 1/2008 | Fernandez-Alonso | |
| | | | H04W 12/069 |
| | | | 455/411 |
| 2009/0240941 A1* | 9/2009 | Lee | H04L 12/66 |
| | | | 713/169 |
| 2015/0281225 A1 | 10/2015 | Schoen et al. | |
| 2016/0029299 A1* | 1/2016 | Qin | H04W 12/06 |
| | | | 370/338 |
| 2016/0248686 A1* | 8/2016 | Lee | H04W 4/24 |
| 2017/0163629 A1* | 6/2017 | Law | H04L 63/0823 |
| 2017/0195332 A1* | 7/2017 | Wu | H04L 63/0876 |
| 2019/0098016 A1* | 3/2019 | Jeon | H04L 63/0823 |

FOREIGN PATENT DOCUMENTS

| | | |
|---|---|---|
| KR | 10-2006-0101800 A | 9/2006 |
| KR | 10-2008-0030575 A | 4/2008 |
| KR | 10-2016-0138063 A | 12/2016 |
| KR | 10-2019-0114432 A | 10/2019 |
| KR | 10-2021-0001728 A | 1/2021 |
| KR | 10-2021-0085090 A | 7/2021 |

OTHER PUBLICATIONS

Kanewala, Thejaka Amila, et al. "A credential store for multi-tenant science gateways." 2014 14th IEEE/ACM International Symposium on Cluster, Cloud and Grid Computing. IEEE, 2014. (Year: 2014).*
Extended European Search Report for EP 22173466.8 by European Patent Office dated Oct. 11, 2022.
Office Action for KR 10-2021-0162302 by Korean Intellectual Property Office dated Jun. 13, 2023.

* cited by examiner

METHOD AND APPARATUS FOR ACCESS CONTROL ON SHIP NETWORK

CROSS-REFERENCE TO RELATED APPLICATIONS

This application claims priority to Korean Patent Application No. 10-2021-0162302 filed on Nov. 23, 2021, with the Korean Intellectual Property Office (KIPO), the entire contents of which are hereby incorporated by reference.

BACKGROUND

1. Technical Field

Exemplary embodiments of the present disclosure relate to a method for controlling access to ship networks, and more particularly, to a method and an apparatus for controlling access to the ship networks to cope with a cyber-attack due to the development of in-ship communication technologies, which enhance security functions through network splitting between in-ship networks and access controls thereon.

2. Related Art

Recently, the development of smart ships such as autonomous ships to which information technology (IT) and operational technology (OT) are applied is accelerating. Accordingly, the application of communication technologies to the inside and outside of the ship is proceeding very actively, and the need for cyber security is also greatly increasing. For example, security is required to prevent considerable damages to human life or property due to abnormal operations of the ship from occurring.

Accordingly, the international maritime organization (IMO), which is an international organization established to deal with international issues related to shipping and ship-building, is implementing cybersecurity risk management regulations.

However, in the shipbuilding and marine industry, there is still a problem that ship-related systems need to secure technologies or systems to prepare for cyber-attacks such as malicious codes. In particular, as the attacks on ship systems have increased hundreds of times in the past three years, research and development on cybersecurity technologies for ships are being conducted accordingly, but the supply of appropriate security measures is still insignificant. As described above, there is a significant need for an appropriate solution for the cybersecurity of ships.

SUMMARY

Accordingly, exemplary embodiments of the present disclosure are provided to substantially obviate one or more problems due to limitations and disadvantages of the related art.

Exemplary embodiments of the present disclosure provide a method and an apparatus for controlling access to ship networks to cope with a cyber-attack due to the development of in-ship communication technologies, which enhance security functions through network splitting between in-ship networks and access controls thereon.

According to a first exemplary embodiment of the present disclosure, a ship network access control method, performed by an access control apparatus connected to a ship network, may comprise: receiving, from an agent installed in a specific sub-network among sub-networks of the ship network, a registration request message requesting registration based on an agent certificate, and verifying the agent certificate; in response to determining that the agent certificate is valid, transmitting, to the agent, agent registration information for the agent; receiving, from the agent, a connection request message generated based on the agent registration information, and verifying the agent registration information; in response to determining that the agent registration information is successfully verified, performing a mutual authentication protocol with the agent; and determining whether to allow a connection between the first terminal and a second terminal located in another sub-network of the ship network or an external network according to an authority of the agent.

The agent registration information may include a public key of the first terminal, a unique identification value capable of identifying the first terminal, and an access token.

The access token may include a value for verifying whether the first terminal is authorized to access resources within the ship network.

The determining of whether to allow the connection may comprise: receiving, from the agent, a connection request message for the second terminal or another agent related to the second terminal; identifying the authority of the agent in response to the connection request message; in response to identifying the authority of the agent, transmitting, to the agent, registration confirmation information for the second terminal or the another agent; and transmitting the registration confirmation information to the second terminal or the another agent.

The ship network access control method may further comprise, before transmitting the registration confirmation information to the second terminal or the another agent, receiving, from the second terminal or the another agent, a message requesting the registration confirmation information.

In the performing of the mutual authentication protocol, information on a service provided by the first agent may be received, and the information on the service may include an Internet protocol (IP) address, a port, and an identifier of the service.

The sub-networks may be connected to an authentication-based network access control channel of the ship network access control apparatus through gateways respectively installed in the sub-networks.

The agent may include a first agent of a host agent type that is installed in a specific terminal within the ship network or a second agent of a gateway type that is coupled with a switch of a sub-network to which another specific terminal in which the first agent is not installed belongs.

The ship network access control method may further comprise controlling access of the second terminal so that data traffic of the second terminal from the another sub-network or the external network is denied, wherein the data traffic is data traffic that is not permitted to connect to the specific sub-network.

According to a second exemplary embodiment of the present disclosure, a ship network access control apparatus for a ship network may comprise: a transceiver connected to the ship network; a memory storing at least one command; and at least one processor connected with the transceiver and the memory, wherein the at least one command causes the at least one processor to: receive, from an agent installed in a specific sub-network among sub-networks of the ship network, a registration request message requesting registration based on an agent certificate, and verify the agent certificate;

in response to determining that the agent certificate is valid, transmit, to the agent, agent registration information for the agent; receive, from the agent, a connection request message generated based on the agent registration information, and verify the agent registration information; in response to determining that the agent registration information is successfully verified, perform a mutual authentication protocol with the agent; and determine whether to allow a connection between the first terminal and a second terminal located in another sub-network of the ship network or an external network according to an authority of the agent.

The agent registration information may include a public key of the first terminal, a unique identification value capable of identifying the first terminal, and an access token.

The access token may include a value for verifying whether the first terminal is authorized to access resources within the ship network.

In the determining of whether to allow the connection, the at least one command may further cause the at least one processor to: receive, from the agent, a connection request message for the second terminal or another agent related to the second terminal; identify the authority of the agent in response to the connection request message; in response to identifying the authority of the agent, transmit, to the agent, registration confirmation information for the second terminal or the another agent; and transmit the registration confirmation information to the second terminal or the another agent.

The at least one command may further cause the at least one processor to: before transmitting the registration confirmation information to the second terminal or the another agent, receive, from the second terminal or the another agent, a message requesting the registration confirmation information.

In the performing of the mutual authentication protocol, information on a service provided by the first agent may be received, and the information on the service may include an Internet protocol (IP) address, a port, and an identifier of the service.

The sub-networks may be connected to an authentication-based network access control channel of the ship network access control apparatus through gateways respectively installed in the sub-networks.

The agent may include a first agent of a host agent type that is installed in a specific terminal within the ship network or a second agent of a gateway type that is coupled with a switch of a sub-network to which another specific terminal in which the first agent is not installed belongs.

The at least one command may further cause the at least one processor to control access of the second terminal so that data traffic of the second terminal from the another sub-network or the external network is denied, wherein the data traffic is data traffic that is not permitted to connect to the specific sub-network.

According to the present disclosure, to cope with a cyber-attack caused by the development of in-ship communication technologies, the security functions of the ship network can be enhanced through network splitting and access control between in-ship networks and access control between the inside and outside of the ship. In addition, according to the present disclosure, network splitting can be effectively performed for a plurality of sub-networks within a ship by using a plurality of types of authentication controller agents, thereby improving the efficiency and reliability of network access control in the ship. In addition, according to the present disclosure, it is made possible to effectively allow or block data traffic between sub-networks or access between the sub-networks and an external network based on authentication through the access control apparatus installed at an upper end of the sub-networks within the ship, so that the security of the ship network can be effectively improved.

DETAILED DESCRIPTION OF THE EMBODIMENTS

Figure 1:
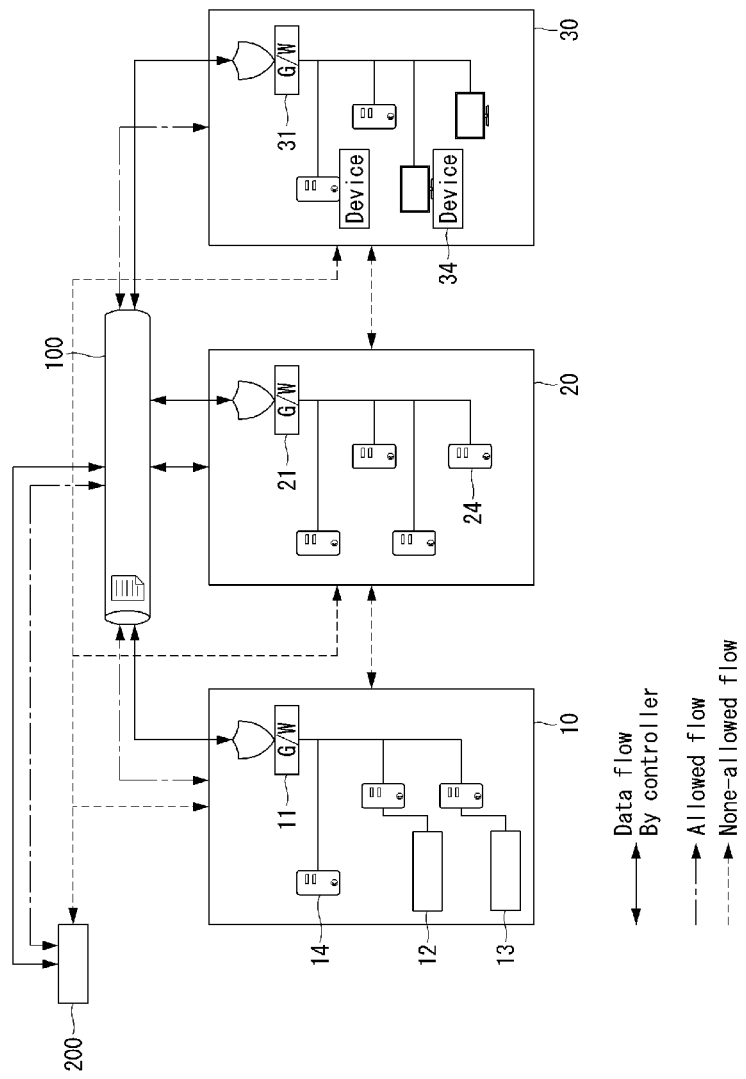
FIG. 1 is a block diagram for describing a method for controlling access to a ship network according to an exemplary embodiment of the present disclosure.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a block diagram for describing a method for controlling access to a ship network according to an exemplary embodiment of the present disclosure.

Referring to FIG. 1, a method for controlling access to a ship network may be implemented by an apparatus (i.e., ship network access control apparatus) 100 for controlling access between sub-networks within a ship. The sub-networks may include an operational technology (OT) network 10, an information technology (IT) network 20, a crew network 30, and the like.

The OT network 10, IT network 20, and crew network 30 may be connected to the ship network access control apparatus 100 or an authentication-based network access control channel controlled by the ship network access control apparatus 100 through the respective gateways (G/W) 11, 21, and 31.

The OT network 10 may include a first gateway (G/W), 11, a plurality of user devices 14, a sensor 12 connected to a specific user device, an actuator 13 connected to a specific user device, and the like. The IT network 20 may include a second gateway (G/W) 21, a plurality of user devices 24, and the like. The crew network 30 may include a third gateway (G/W) 31, a plurality of user devices 34, and the like.

The ship network access control method may be implemented by an authentication-based network control apparatus to control data traffic between sub-networks existing within the ship and may be applied to the upper end of the sub-networks. Specifically, a computing device implementing the ship network access control method or the ship network access control apparatus 100 may control access through mutual authentication when data is exchanged between the OT network, IT network, and crew network.

In addition, the ship network access control apparatus 100 may control access of an external network 200 based on authentication when a sub-network is accessed by the external network 200. In addition, the ship network access control apparatus 100 may deny access of data traffic for which connection is not permitted based on authentication.

In FIG. 1, a data flow by a controller of the ship network access control apparatus 100 is represented by a solid line, a flow for which connection is allowed by the controller is represented by a dashed-dotted line, and a flow for which connection is not allowed by the controller is represented by a dotted line.

Figure 2:
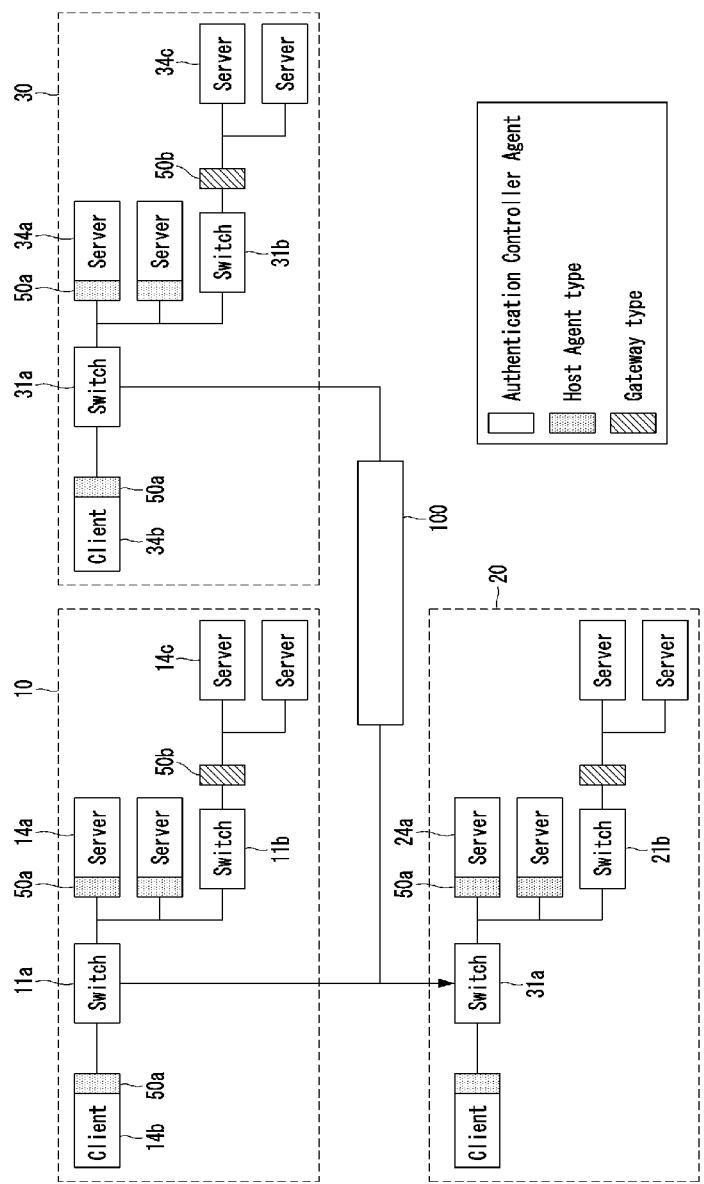
FIG. 2 is a conceptual diagram for describing a network splitting structure using a ship network access control apparatus according to an exemplary embodiment of the present disclosure.

FIG. 2 is a conceptual diagram for describing a network splitting structure using a ship network access control apparatus according to an exemplary embodiment of the present disclosure.

Referring to FIG. 2, the ship network access control apparatus 100 may split the ship network into the sub-networks 10, 20, and 30 through authentication controller agents. The authentication controller agents may include a first agent 50a of a host agent type and a second agent 50b of a gateway type. The sub-networks may be connected to each other through first switches 11a, 21a, and 31a installed in the respective sub-networks.

The first agent 50a may be referred to as a 'server agent' when installed on a server device 14a, 24a, or 34a, and may be referred to as a 'user agent' when installed on a user device 14b or 34b. For the security of service devices 14b or 34c or user devices in which the first agent 50a is not installed, the second agent 50b may be installed at each rear end of second switches 11b, 21b, and 31b of the sub-networks 10, 20, and 30.

As described above, the network access control apparatus 100 of the present exemplary embodiment may separate the sub-networks 10, 20, and 30 through the authentication controller agents, and effectively perform access control between them and between them and an external network.

Figure 3:
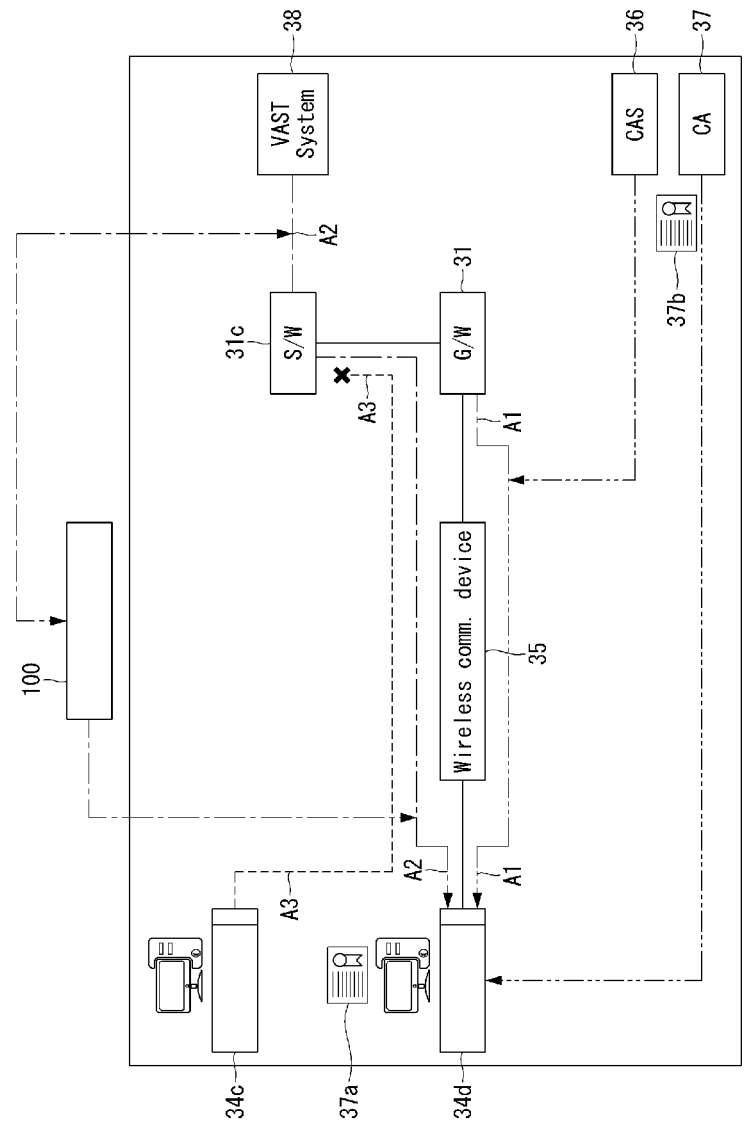
FIG. 3 is a conceptual diagram for describing an operation principle of the ship network access control apparatus of FIG. 2.

FIG. 3 is a conceptual diagram for describing an operation principle of the ship network access control apparatus of FIG. 2.

Referring to FIG. 3, the network access control apparatus 100 may control an access A1 between an authentication device (or, device to be authenticated or authentication target device) 34d and the gateway 31 through an authentication verification server 36. The authentication device 34d may be a server device, a user device, or the like, and a first agent may be installed in the authentication device 34d.

In this case, the network access control apparatus 100 may authenticate the authentication device 34d by using a public key certificate 37b of the authentication device 34d registered with a certification authority 37, and may allow the authentication device 34d to access the gateway 31 through a wireless local area network (LAN) or an internal network. The wireless LAN may be formed by a wireless communication device 35.

In addition, the network access control apparatus 100 may support external communication A2 based on a certificate such as the public key certificate 37b so that the authentication device 34d can access a VAST system 38 such as an external network, database management system, storage server, web server, or the like through the gateway 31 and the switch 31c.

On the other hand, when an unauthenticated device 34c within a sub-network such as the crew network attempts an access A3 to an external network through the gateway 31 and the switch 31c, the network access control apparatus 100 may perform control thereon so that external communication of the unauthenticated device 34c is blocked and its access to the external is restricted. The unauthenticated device 34c may be a user device or a server device in which the first agent is installed, a user device or a server device in which the first agent is not installed, or an arbitrary terminal that is not identified in the ship.

According to the present exemplary embodiment, it is possible to efficiently control access for internal communication within the same network or external communication.

Figure 4:
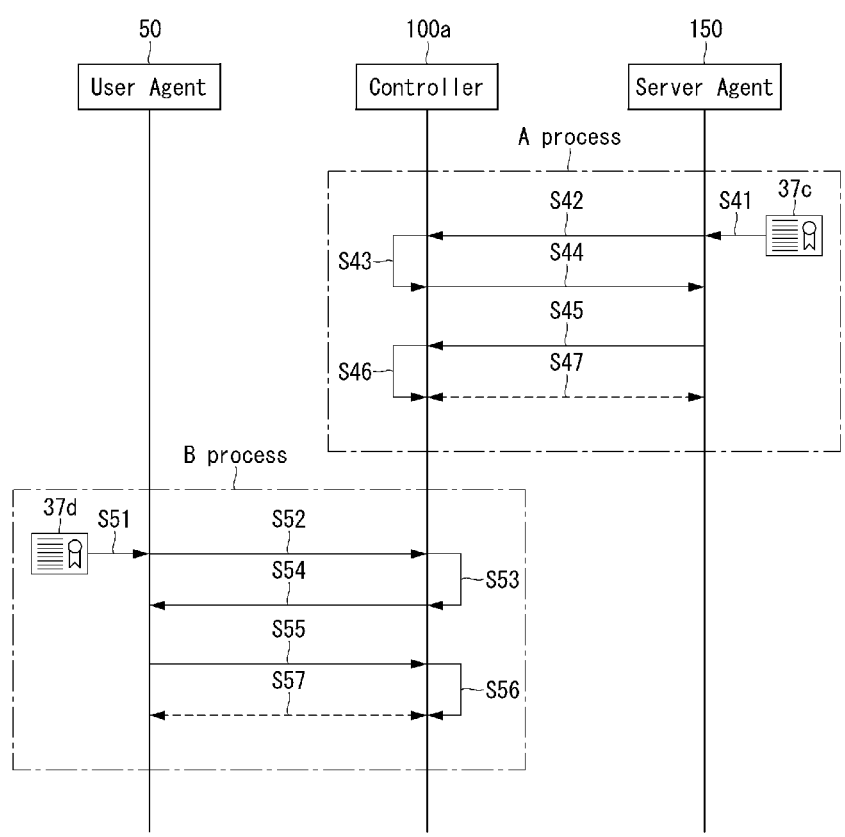
FIG. 4 is a sequence chart for describing a registration procedure between an agent and a controller of the ship network access control apparatus of FIG. 2.

FIG. 4 is a sequence chart for describing a registration procedure between an agent and a controller of the ship network access control apparatus of FIG. 2.

Referring to FIG. 4, a server agent 150 connected to a controller 100a of the ship network access control apparatus through a wired and/or wireless network may transmit a registration request message requesting registration of the server agent 150 based on a first certificate 37c to the controller 100a of the ship network access control apparatus.

Then, the controller 100a may verify the registration information according to the reception of the connection request message (S56), and transmit, to the user agent 50, information on a service that can be provided by the user agent 50 to perform a mutual authentication protocol with the user agent 50 (S57). The mutual authentication may use a TLS or any other mutual authentication-based network encryption protocol corresponding thereto. The information on the service may include an IP address, port, service ID, and the like of the service.

Then, the server agent 150 may transmit a connection request message to the controller 100a based on the registration information received from the controller 100a (S45).

Then, the controller 100a may verify the registration information according to the reception of the connection request message (S46), and may provide, to the server agent 150, information on a service that can be provided by the server agent 150 to perform a mutual authentication protocol with the server agent 150 (S47).

The mutual authentication protocol may use a transport layer security (TLS) or any other mutual authentication-based network encryption protocol corresponding thereto, and the information on the service may include an Internet protocol (IP) address, port, service ID, etc.

The above-described steps S41 to S47 may be a registration procedure performed between the controller 100a and the server agent 150 and may be referred to as a first process (i.e., A process) or a server agent registration process.

On the other hand, a user agent 50 connected to the controller 100a of the ship network access control apparatus through a wired and/or wireless network may transmit a registration request message for requesting registration of a user device based on a second certificate 37d to the controller 100a of the ship network access control apparatus (S51, S52).

Then, the controller 100a may verify the validity of the second certificate 37d received through the registration request message (S53), and transmit registration information for confirmation of the user agent 50 to the user agent 50 (S54). Here, the registration information may include a key, a unique identification value or unique identifier capable of identifying the user agent 50, an access token, and the like.

Then, the user agent 50 may transmit a connection request message to the controller 100a based on the registration information received from the controller 100a (S55).

Then, the controller 100a may verify the registration information according to the reception of the connection request message (S56), and transmit, to the user agent 50, information on a service that can be provided by the user agent 50 to perform a mutual authentication protocol with the user agent 50 (S47). The mutual authentication may use a TLS or any other mutual authentication-based network encryption protocol corresponding thereto. The information on the service may include an IP address, port, service ID, and the like of the service.

The above-described steps S51 to S57 are a registration procedure performed between the controller 100a and the user agent 50 and may be referred to as a second process (B process) or a user device agent registration process.

According to the present exemplary embodiment, in the registration procedure between the controller and the agent, the information of each agent is registered in the controller to allow access of the agents separated from each other, so that access control to the network can be performed effectively with high security. In particular, when the registration process is successfully completed, a connection process for subsequent network access can be performed, so that access control on the ship network can be effectively performed.

Figure 5:
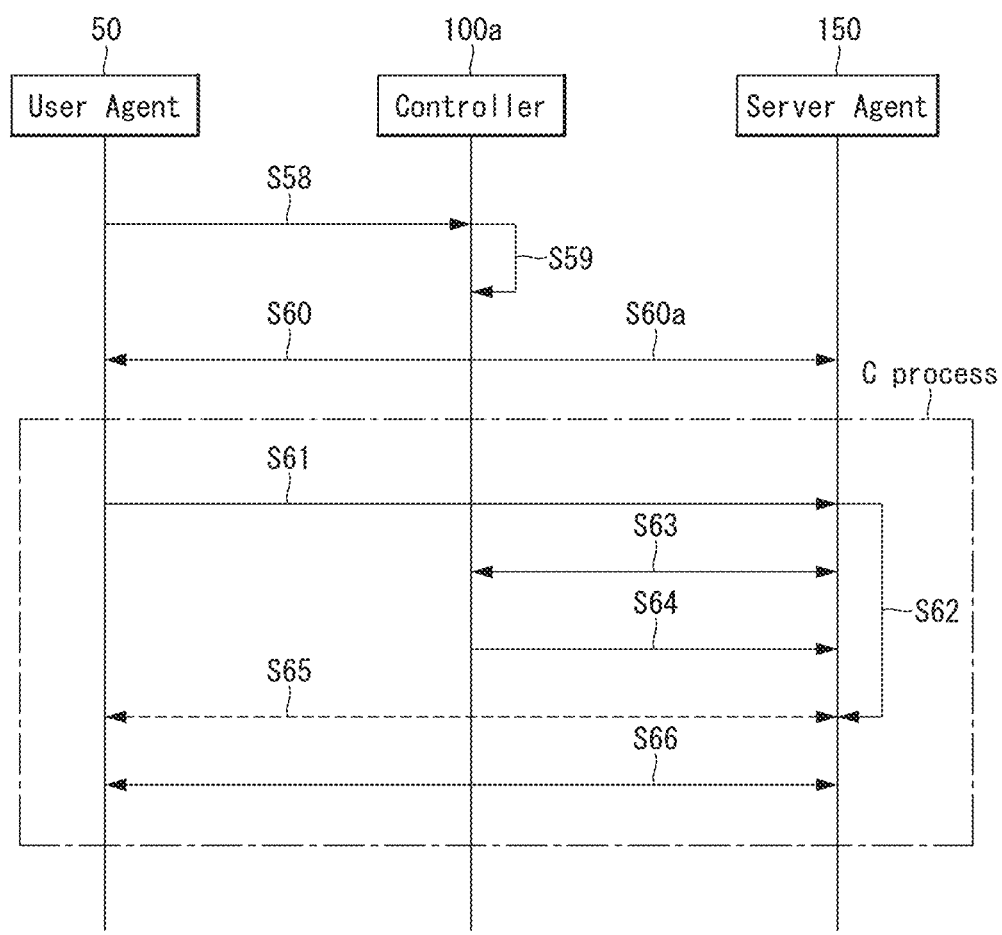
FIG. 5 is a sequence chart illustrating a connection procedure between an agent and a controller of the ship network access control apparatus of FIG. 2.

FIG. 5 is a sequence chart illustrating a connection procedure between an agent and a controller of the ship network access control apparatus of FIG. 2.

Referring to FIG. 5, the user agent 50 that has completed the registration procedure may receive information on the server agent 150 to be connected through the network through the controller 100a. That is, through the above-described registration procedure, the controller 100a may retain information on the server agent 150 to which the user agent 50 wants to access.

Then, the user agent 50 may perform mutual authentication with the server agent 150 through the connection procedure and establish a connection through the network. Specifically, the user agent 50 may request information on the server agent 150 to be connected through the network from the controller 100a (S58).

Then, the controller 100a may first identify the authority of the user agent 50 in response to the connection request message of the user agent 50 (S59). Here, the controller 100a may apply network-splitting according to a position or a network position of the server agent 150 to which the user agent 50 intends to access.

Then, the controller 100a may transmit, to the user agent 50, information on server agents to which the user agent 50 can access or a list of the server agents through a connection response message corresponding to the connection request message (S60). In this case, the controller 100a may not transmit registration confirmation information used in the registration procedure of the user agent 50 to the user agent 50 by including it in the connection response message, but may transmit new registration confirmation information to be used in the connection procedure to the user agent 50 by including it in the connection response message.

Here, the controller 100a may transmit the new registration confirmation information to the server agent 150 to which the user agent 50 intends to access while transmitting the connection response message to the user agent 50 (S60a). The new registration confirmation information may refer to new authentication information of the existing registration confirmation information.

Then, the user agent 50 may transmit a connection request message to the server agent 150 based on the information on the server agents or the list of the server agents received from the controller 100a (S61). The connection request message may include the new registration confirmation information.

Here, the server agent 150 may identify the new registration confirmation information received from the user agent 50 based on the new registration confirmation information previously received from the controller 100a, but exemplary embodiments of the present disclosure are not limited thereto. That is, the server agent 150 may request the new registration confirmation information from the controller 100a in response to the connection request message of the user agent 50 (S62), receive the new registration confirmation information from the controller 100a through a response message (S63), and then may confirm the new registration confirmation information received from the user agent 50 based on the new registration confirmation information received from the controller 100a. As described above, when the server agent 150 confirms the authentication information of the user agent 50, one of the above two schemes may be selected to perform the verification.

Then, the server agent 150 may verify information required for connection with the user agent 50 based on the new registration confirmation information (S64), and perform a mutual authentication protocol procedure with the user agent 50 (S65).

When the mutual authentication protocol procedure is completed, the user agent 50 may be connected to the server agent 150 through user authentication for the server device and may transmit and receive signals and data with the server agent 150.

Figure 6:
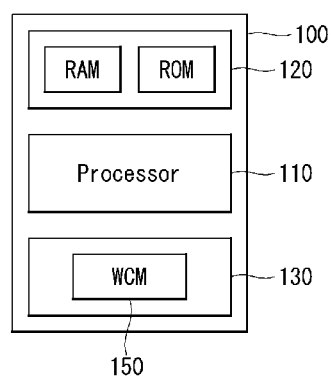
FIG. 6 is a block diagram illustrating a configuration of the ship network access control apparatus of FIG. 2.

FIG. 6 is a block diagram illustrating a configuration of the ship network access control apparatus of FIG. 2.

Referring to FIG. 6, the ship network access control apparatus 100 may include at least one processor 110, a memory 120, and a transceiver 130 connected to a network to perform communications. The ship network access control apparatus 100 may be configured to include a controller and the transceiver 130. In this case, the controller may include the processor 110 and the memory 120. The transceiver 130 may include a communication subsystem supporting a wired network or a wireless communication module (WCM) 150 supporting a wireless network.

In addition, the ship network access control apparatus 100 may include a user agent or server agent having the same or similar configuration. The user agent or server agent may be configured to include a processor, a memory, and a transceiver as components thereof.

In addition, the ship network access control apparatus 100 may further include an input interface device, an output interface device, a storage device, and the like. The respective components included in the ship network access control apparatus 100 may be connected by a bus to communicate with each other.

However, each of the components included in the ship network access control apparatus 100 may be connected through an individual interface or an individual bus centering on the processor 110 instead of the common bus. For example, the processor 110 may be connected to at least one of the memory 120, the transceiver 130, the input interface device, the output interface device, and the storage device through a dedicated interface.

The processor 110 may execute program commands stored in at least one of the memory 120 and the storage device. The processor 110 may refer to a central processing unit (CPU), a graphics processing unit (GPU), or a dedicated processor on which the method according to the exemplary embodiment of the present disclosure is performed. Each of the memory 120 and the storage device may be configured as at least one of a volatile storage medium and a non-volatile storage medium. For example, the memory 120 may be configured as at least one of a read only memory (ROM) and a random access memory (RAM).

The above-described program commands may include: commands for receiving a registration request message for registration based on a certificate from a first agent connected to the ship network; commands for validating the certificate; commands for transmitting registration information for the first agent to the first agent when the certificate is validated; commands for receiving a connection request message generated based on the registration information from the first agent; commands for verifying the registration information upon receipt of the connection request message; commands for performing a mutual authentication protocol procedure with the first agent or a first terminal in which the first agent is installed when verification of the registration information is normally completed; and commands for determining whether to allow a connection between the first terminal and a second terminal based on registration information or a certificate of each of the first terminal and the second terminal to which the first terminal intends to connect.

The exemplary embodiments of the present disclosure may be implemented as program instructions executable by a variety of computers and recorded on a computer-readable medium. The computer-readable medium may include a program instruction, a data file, a data structure, or a combination thereof. The program instructions recorded on the computer-readable medium may be designed and configured specifically for the present disclosure or can be publicly known and available to those who are skilled in the field of computer software.

Examples of the computer-readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions, and alterations may be made herein without departing from the scope of the present disclosure.

What is claimed is:

1. A ship network access control method performed by an access control apparatus connected to a ship network, the ship network access control method comprising:
receiving, from a first authentication controller agent installed in a first sub-network among sub-networks of the ship network, a registration request message requesting registration based on a first certificate, and verifying validity of the first certificate;
in response to determining that the first certificate is valid, transmitting, to the first authentication controller agent, registration information for the first authentication controller agent;
receiving, from a second authentication controller agent installed in a second sub-network among sub-networks of the ship network, a registration request message requesting registration based on a second certificate, and verifying validity of the second certificate;
in response to determining that the second certificate is valid, transmitting, to the second authentication controller agent, registration information for the second authentication controller agent;

receiving, from the first authentication controller agent or the second authentication controller agent, a connection request message generated based on the registration information, and verifying an authority of the first or the second authentication controller agent according to the reception of the connection request message;

in response to determining that the authority of the first or the second authentication controller agent is verified, for performing a mutual authentication protocol with the first or the second authentication controller agent, transmitting a list or information on a service provided by the second authentication controller agent and the registration confirmation information to be used in a connection procedure to the first authentication controller agent, or a list or information on a service provided by the first authentication controller agent and registration confirmation information to be used in a connection procedure to the second authentication controller agent; and determining whether to allow a connection between a first terminal in the first sub-network and a second terminal located in the second sub-network of the ship network or between the first terminal or the second terminal and a terminal in an external network according to the authority of the first or the second authentication controller agent, wherein the registration confirmation information is used to verify information required for connection between the first authentication controller agent and the second authentication controller agent, and information required for connection between the first authentication controller agent or the second authentication controller agent and the terminal in the external network, before performing the mutual authentication protocol.

2. The ship network access control method according to claim 1, wherein the registration information of the first authentication controller agent includes a public key of the first terminal, a unique identification value capable of identifying the first terminal, and an access token.

3. The ship network access control method according to claim 2, wherein the access token includes a value for verifying whether the first terminal is authorized to access resources within the ship network.

4. The ship network access control method according to claim 1, further comprising, in response to identifying the authority of the first authentication controller agent, transmitting, to the first terminal, the registration confirmation information for the second terminal or the second authentication controller agent,
wherein the registration confirmation information includes authentication information of an existing registration confirmation information used in a registration procedure of the first or the second authentication controller agent.

5. The ship network access control method according to claim 4, further comprising, when the first terminal performs a connection procedure to the second terminal based on the registration confirmation information for the second terminal or the second authentication controller agent, allowing or blocking data traffic between sub-networks or access between the sub-networks and an external network based on authentication through the access control apparatus installed at an upper end of the sub-networks.

6. The ship network access control method according to claim 1, wherein in the performing of the mutual authentication protocol, information on a service provided by the first authentication controller agent is received, and the information on the service includes an Internet protocol (IP) address, a port, and an identifier of the service.

7. The ship network access control method according to claim 1, wherein the sub-networks are connected to an authentication-based network access control channel of the ship network access control apparatus through gateways respectively installed in the sub-networks.

8. The ship network access control method according to claim 1, wherein the first or the second authentication controller agent includes a first agent of a host agent type that is installed in a specific terminal within the ship network or a second agent of a gateway type that is coupled with a switch of a sub-network to which another specific terminal in which the first agent is not installed belongs.

9. The ship network access control method according to claim 1, further comprising controlling access to the first terminal so that data traffic of the second terminal from the second sub-network or data traffic from the terminal of the external network is denied, wherein the data traffic is data traffic that is not permitted to access to the first sub-network.

10. A ship network access control apparatus for a ship network, comprising:
a transceiver connected to the ship network;
a memory storing at least one command; and
at least one processor connected with the transceiver and the memory, wherein the at least one command causes the at least one processor to:
receive, from a first authentication controller agent installed in a first sub-network among sub-networks of the ship network, a registration request message requesting registration based on a first certificate, and verify validity of the first certificate;
in response to determining that the first certificate is valid, transmit, to the first authentication controller agent, registration information for the first authentication controller agent;
receive, from a second authentication controller agent installed in a second sub-network among sub-networks of the ship network, a registration request message requesting registration based on a second certificate, and verifying validity of the second certificate;
in response to determining that the second certificate is valid, transmit, to the second authentication controller agent, registration information for the second authentication controller agent;
receive, from the first authentication controller agent or the second authentication controller agent, a connection request message generated based on the registration information, and verify an authority of the first or the second authentication controller agent according to the reception of the connection request message;
in response to determining that the authority of the first or the second authentication controller agent is verified, for performing a mutual authentication protocol with the first or the second authentication controller agent, transmitting a list or information on a service provided by the second authentication controller agent and registration confirmation information to be used in a connection procedure to the first authentication controller agent, or a list or information on a service provided by the first authentication controller agent and the registration confirmation information to be used in a connection procedure to the second authentication controller agent; and
determine whether to allow a connection between a first terminal in the first sub-network and a second terminal located in the second sub-network of the ship network or between the first terminal or the second terminal and a terminal in an external network according to the authority of the first or the second authentication controller agent, wherein the registration confirmation information is used to verify information required for connection between the first authentication controller agent and the second authentication controller agent, and information required for connection between the first authentication controller agent or the second authentication controller agent and the terminal in the external network, before performing the mutual authentication protocol.

11. The ship network access control apparatus according to claim 10, wherein the registration information of the first authentication controller agent includes a public key of the first terminal, a unique identification value capable of identifying the first terminal, and an access token.

12. The ship network access control apparatus according to claim 11, wherein the access token includes a value for verifying whether the first terminal is authorized to access resources within the ship network.

13. The ship network access control apparatus according to claim 10, wherein the at least one command further causes the at least one processor to:

in response to identifying the authority of the first authentication controller agent, transmit, to the first terminal, the registration confirmation information for the second terminal or the second authentication controller agent, wherein the registration confirmation information includes authentication information of an existing registration confirmation information used in a registration procedure of the first or the second authentication controller agent.

14. The ship network access control apparatus according to claim 13, wherein the at least one command further causes the at least one processor to: when the first terminal performs a connection procedure to the second terminal based on the registration information or the registration confirmation information for the second terminal or the second authentication controller agent, allow or block data traffic between sub-networks or access between the sub-networks and an external network based on authentication through the access control apparatus installed at an upper end of the sub-networks.

15. The ship network access control apparatus according to claim 10, wherein the at least one command further causes the at least one processor to receive, from the first authentication controller agent, information on a service provided by the first authentication controller agent for performing the mutual authentication protocol, wherein the information on the service includes an Internet protocol (IP) address, a port, and an identifier of the service.

16. The ship network access control apparatus according to claim 10, wherein the sub-networks are connected to an authentication-based network access control channel of the ship network access control apparatus through gateways respectively installed in the sub-networks.

17. The ship network access control apparatus according to claim 10, wherein the first or the second authentication controller agent includes a first agent of a host agent type that is installed in a specific terminal within the ship network or a second agent of a gateway type that is coupled with a switch of a sub-network to which another specific terminal in which the first agent is not installed belongs.

18. The ship network access control apparatus according to claim 10, wherein the at least one command further causes the at least one processor to control access to the first terminal so that data traffic of the second terminal from the second sub-network or data traffic from the terminal of the external network is denied, wherein the data traffic is data traffic that is not permitted to access to the first sub-network.

* * * * *